A. H. DE VOE.
UNIVERSAL JOINT COUPLING.
APPLICATION FILED JUNE 22, 1918.

1,387,043.

Patented Aug. 9, 1921.

WITNESSES:
G. L. Ferris

INVENTOR
Albert H. DeVoe
BY
Henry J. Miller
ATTORNEY

UNITED STATES PATENT OFFICE.

ALBERT H. DE VOE, OF WESTFIELD, NEW JERSEY, ASSIGNOR TO THE SINGER MANUFACTURING COMPANY, A CORPORATION OF NEW JERSEY.

UNIVERSAL JOINT-COUPLING.

1,387,043.  Specification of Letters Patent.  Patented Aug. 9, 1921.

Original application filed June 14, 1917, Serial No. 174,647. Divided and this application filed June 22, 1918. Serial No. 241,370.

*To all whom it may concern:*

Be it known that I, ALBERT H. DE VOE, a citizen of the United States, residing at Westfield, in the county of Union and State of New Jersey, have invented certain new and useful Improvements in Universal Joint-Couplings, of which the following is a specification, reference being had therein to the accompanying drawings.

This invention relates to a universal joint, such as that disclosed in my copending application Serial No. 174,647, filed June 14, 1917, of which this is a division.

The objects of my invention are to provide a universal joint which is simple, can be manufactured at a minimum cost and which is readily separable into its component parts.

The invention comprises shaft-sections, one of which is provided with a projection at one end formed with opposed cylindrically convexed faces, the axis of said faces being transverse to the shaft axis. This projection is adapted to be inserted in a transverse slot cut in an enlargement on the end of an adjacent shaft-section. Variously modified means are provided for preventing lateral displacement of the projection in the slot, and if desired for preventing longitudinal displacement.

Figure 1:
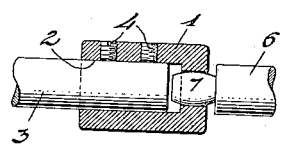
Figure 2:
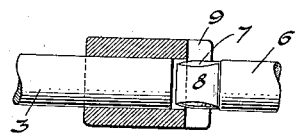
Figure 3:
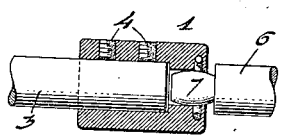
Figure 4:
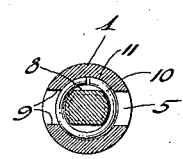
Figure 5:
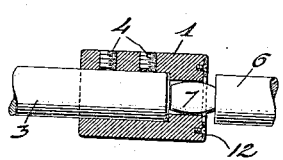
Figure 6:
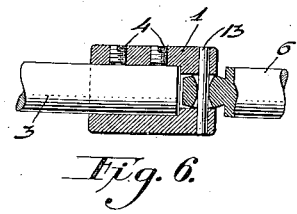

Referring to the drawings, Figure 1 is a longitudinal section of the universal joint. Fig. 2 is a longitudinal section taken in a plane at right angles to that in Fig. 1. Fig. 3 is a section similar to Fig. 1, showing a slight modification. Fig. 4 is a transverse section through the joint shown in Fig. 3, and Figs. 5 and 6 are longitudinal sections similar to Fig. 1, showing still further modifications.

Referring to Figs. 1 and 2, the joint comprises a coupling member 1 having a socket 2 in which an end of a shaft-section 3 is secured by set-screws 4. The bottom of the socket is closed except for a transverse slot 5 cut diametrically across the same. The complementary shaft-section 6 has on its abutting end a projection 7 which enters the slot 5. This projection has opposed cylindrically convexed faces 8, the elements of which extend substantially parallel with the walls 9 of the slot. Between these walls the projection 7 may pivot about an axis intermediate thereof and in parallelism therewith. It may also pivot or twist between these walls on an axis perpendicular thereto.

The universal joint *per se* is identical in all forms of the invention. The difference between the forms lies in the means used for retaining the shaft-sections against lateral or longitudinal displacement.

In the form shown in Figs. 1 and 2 provision is made for preventing lateral displacement of the shaft end in the slot 5 by extending the projection 7 slightly beyond the slot and into the socket 2. In order that there may be relative angular movement of the parts the projection 7 is slightly reduced in width at the end (Fig. 2) to permit a limited play of the projection in the socket.

In the form shown in Figs. 3 and 4 lateral displacement is prevented by a split keeper ring 10 snapped into a groove 11 in the coupling, the internal diameter of this ring being slightly greater than the width of the projection.

A similar result is attained in the form shown in Fig. 5 by securing an exterior ring or washer 12 to the end of the coupling 1, the interior diameter of this washer also being slightly greater than the width of the projection 7.

In the form shown in Fig. 6 a keeper element is provided comprising a pin 13 passing through the coupling 1 and projection 7 at right angles to the length of the slot 5, the opening for said pin in projection 7 being flared at each end to permit relative angular movement.

It will be noted that in the forms shown in Figs. 1 to 5 only lateral displacement of the shaft-sections is prevented, and the sections may be readily uncoupled by merely moving them endwise, but in the form shown in Fig. 6 both lateral and longitudinal displacement are prevented by the pin 13.

The invention is not limited to the specific construction shown and described, and may be modified in various ways within the scope of the appended claims.

Having thus set forth the nature of the invention, what I claim herein is—

1. In a universal joint for line shafts made up of a plurality of sections, coupling members on the abutting ends of adjacent shaft-sections, one of said coupling members having substantially flat walls defining a diametrically arranged slot therein with a central recess at the bottom of the slot and the other of said coupling members having a tongue-like projection with convex cylindrical faces the elements of which faces are disposed in parallelism to the walls defining the slot in the first-mentioned coupling member, said projection extending into said recess to thereby keep said faces and walls in coöperative engagement but permitting a limited relative angular rotation of the walls and faces about an axis at right angles to said walls defining the slot.

2. In a universal joint for line shafting, a shaft-section having a pair of oppositely convex cylindrical faces the elements of which are all parallel to one another, a one-piece coupling member having walls in tangential engagement with said faces, said one-piece coupling being secured to an adjacent shaft-section, and means disposed internally of said coupling for loosely keeping said faces and walls against lateral displacement sufficient to disengage the coöperative faces and walls but permitting a limited relative angular rotation thereof about an axis at right angles to said walls.

3. A universal coupling for line shafting comprising a plurality of sections, one of said sections being formed at one end with parallel flat faces and an adjacent central aperture and the other of said sections being formed with curved faces disposed upon opposite sides of its axis and in engagement with said flat faces and extending into said aperture whereby relative lateral displacement of the sections is prevented.

4. In a universal joint, a socket member having a bore therein and a slot across its end of less width than the diameter of said bore, a shaft section secured in said bore, a second shaft section having curved faces adjacent its end coöperating with the walls of said slot to provide for universal movement, and the end projecting into said bore, whereby a relative bodily lateral movement of the sections is prevented.

5. In a universal joint, a socket member having a diametrical slot at one end and a bore of greater diameter than the width of the slot extending into its other end and terminating at the bottom of said slot, a shaft section secured in said bore, a second shaft section having at one end opposed curved faces extending transversely of its axis, said faces having a straight line engagement with the walls of said slot and extending into the bore, the portion extending therein being slightly narrowed.

6. In a universal joint, a socket member having a bore extending partly therethrough, a shaft section secured in said bore with its end terminating short of the end of the bore, said socket member having a diametrical slot across its closed end opening into said bore, and a second shaft section of the same diameter as the first formed at one end with cylindrically convex opposed faces transverse to its axis, said faces being disposed between and in contact with the walls of said slot, the extreme end of said second shaft being slightly tapered in a direction transverse to said faces and extending into said bore beyond said slot.

In testimony whereof, I have signed my name to this specification.

ALBERT H. DE VOE.